United States Patent Office 2,772,273
Patented Nov. 27, 1956

2,772,273
HETEROCYCLIC VAT DYESTUFFS

Wilhelm Schmidt-Nickels, Little York, N. J., and Lewis J. Lugg, Pen Argyl, Pa., assignors to General Aniline & Film Corporation, New York, N. Y., a corporation of Delaware No Drawing. Application December 28, 1954,
Serial No. 478,170

12 Claims. (Cl. 260—295)

This invention relates to production of novel heterocyclic vat dyestuffs having the formula

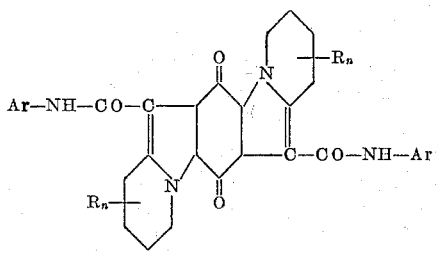

wherein Ar represents an aromatic radical; R is selected from the group consisting of alkyl and alkoxy; and $n$ has a value of 0 to 3.

It has been found that these compounds constitute a group of improved vat dyestuffs which produce grey shades of good fastness to washing, chlorine and light when dyed and printed in the usual manner.

The dyestuffs of this invention may be produced by the reaction of tetrachloroquinone (chloranil) with a pyridine unsubstituted in the 2-position and an N-aromatic acetoacetamide of the formula $$CH_3-CO-CH_2-CO-NH-Ar$$

The exact mechanism of the reaction is not clearly understood, but it is believed that it proceeds in the manner portrayed in the following equations wherein the N-aromatic acetoacetamide employed is acetoacetanilide:

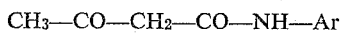

It will be understood that in carrying out the foregoing reaction, the pyridine and acetoacetamide reactants may contain inert substituents which do not interfere with the desired reaction. Thus, the aromatic residue of the N-aromatic acetoacetamide may comprise an aryl radical of the benzene or naphthalene series which may further contain nuclear substituents, fused rings, etc., for example halo- such as chloro-, or bromo-, alkoxy- such as methoxy-, ethoxy- or butoxy-, alkyl- such as methyl-, ethyl- or butyl-, phenyl-, naphthyl-, or the like. Similarly, the pyridine substituent R may be methyl, ethyl, propyl, isopropyl, methoxy, ethoxy, propoxy or the like. The reaction takes place readily in proportions of about one mole of chloranil, two moles of the pyridine and two moles of the N-aromatic acetoacetamide.

Since the reaction involves liberation of HCl, it is desirable to conduct the reaction in the presence of an acid acceptor. It is preferable to employ the pyridine reactant in an amount in excess of that required for the instant reaction. The excess pyridine serves as an acid acceptor and as a convenient liquid medium in which to carry out the reaction. However, other liquid media may be employed which boil within or above the range of temperatures required for the reaction which may be from about 30° to 150° C. Selection of a liquid medium which boils at the desired reaction temperature facilitates temperature control since the reaction may then be carried out under reflux. The reaction product is usually insoluble in the liquid medium employed for the reaction and the precipitate may be readily separated by filtration, washing and the like. However, in instances where the reaction product is soluble in the liquid medium, it may be conveniently separated by drowning in water followed by filtration, washing and the like.

If desired, the vat dyestuffs of this invention may be converted into the alkali metal salts of the disulfuric acid esters of their leuco forms by the usual known methods such as by treatment with a reducing agent or metal in pyridine-chlorosulfonic acid solution, or by first reducing to the leuco compound and then esterifying in the normal way in an aqueous solution by the action of teritary amine addition production of sulfur trioxide or in any other suitable manner, followed by treatment with a suitable sodium or potassium compound to produce the desired salt.

The dyestuffs of this invention may be employed for coloring, dyeing or printing film or fibrous material in any form and having a basis of natural or artificial polymeric material such as cotton or other natural cellulosic material, regenerated cellulose such as derived by the viscose or cuprammonium process or by saponification of

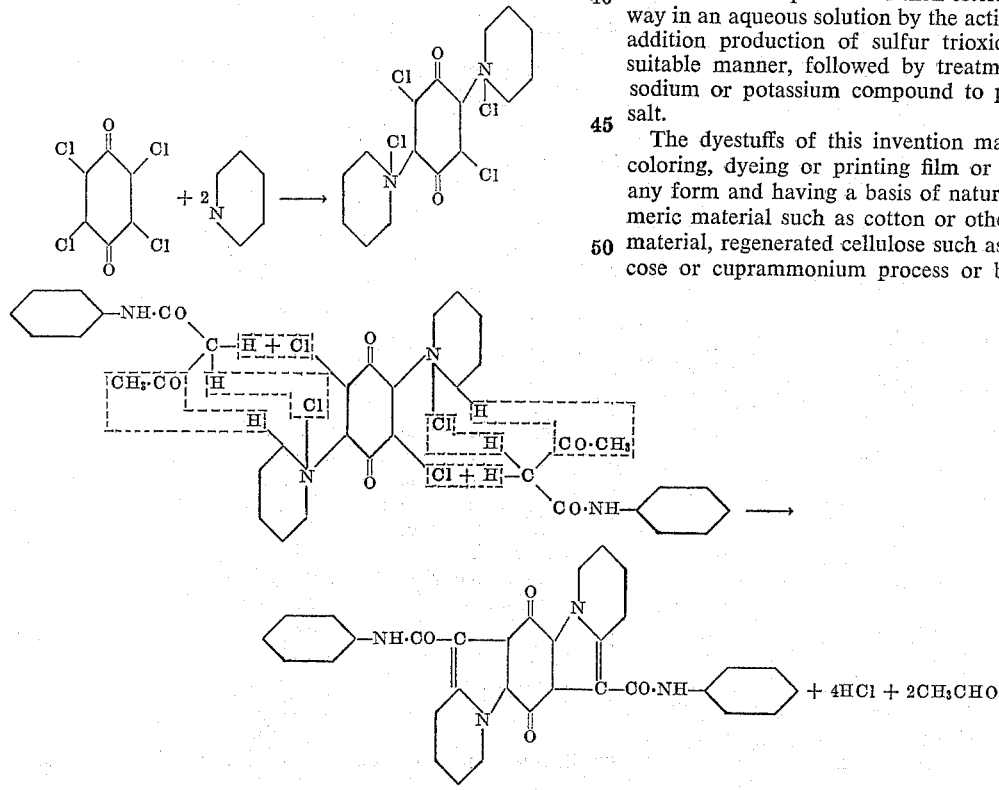

cellulose esters, or other material capable of being colored by vat dyestuffs in soluble, dispersed or pigment form.

The following examples are illustrative of preferred embodiments of this invention and are not to be regarded as limitative. Parts are in grams by weight, in cc. by volume.

Example 1

A mixture of 49.2 parts by weight chloranil and 70.8 parts by weight of acetoacetanilide was added to 650 parts by volume pyridine.

Due to heat of reaction the temperature rose to about 65° C. The charge was then stirred at reflux for 4 hours. The reaction product was filtered off at room temperature, washed with pyridine, acetone, water and dried. It has the structure:

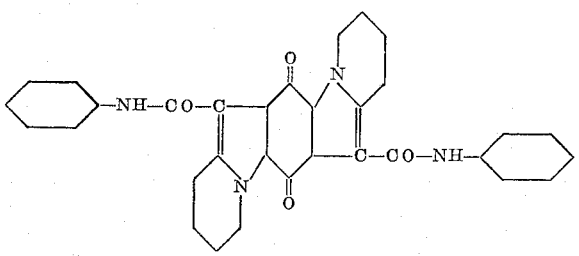

Found: C=73.20%, H=3.99%, N=10.48%. Theory for $C_{32}H_{20}O_4N_4$: C=73.27%, H=3.84%, N=10.69.

The compound dyes cotton from an alkaline hydrosulfite vat in grey shades of good fastness to washing, chlorine and light.

Example 2

A charge of 75 parts by volume pyridine, 8.5 parts by weight acetoacet-ortho-chloranilide and 4.9 parts by weight chloranil was stirred at reflux for 4 hours. The reaction mixture was worked up as described in Example 1. The dyestuff has the apparent structure:

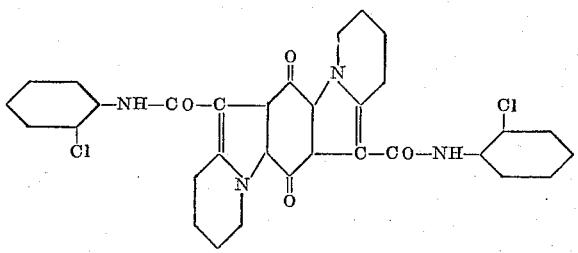

Its cotton dyeings are grey, more greenish tinted than the dyeings of the compound of Example 1, and are of the same good fastness properties.

Example 3

A charge of 75 parts by volume pyridine, 8.3 parts by weight acetoacet-ortho-anisidide and 4.9 parts by weight chloranil was stirred at reflux for 4 hours. The reaction was worked up as described in Example 1. The dyestuff has the apparent structure:

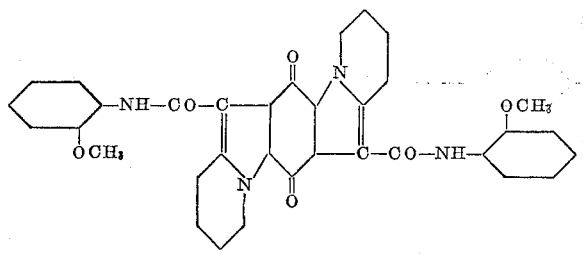

The dyeings with this product are grey, a little bluish tinted in comparison with the dyeings of the compound of Example 1 and of the same fastness properties.

Example 4

A charge of 70 parts by volume pyridine, 7.6 parts by weight acetoacet-ortho-toluidide and 4.9 parts by weight chloranil was stirred at reflux for 4 hours. The reaction mixture was worked up as described in Example 1. The dyestuff has the apparent structure:

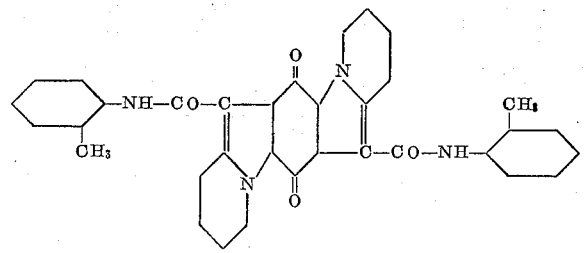

and gives grey dyeings of less bluish tint than obtained with the product of Example 3. The fastness properties are similar.

Example 5

A charge of 35 parts by volume pyridine, 4.3 parts by weight acetoacet-beta-naphthylamide and 2.3 parts by weight chloranil was stirred at reflux for 4 hours. The reaction product was worked up as described in Example 1. The dyestuff has the apparent structure:

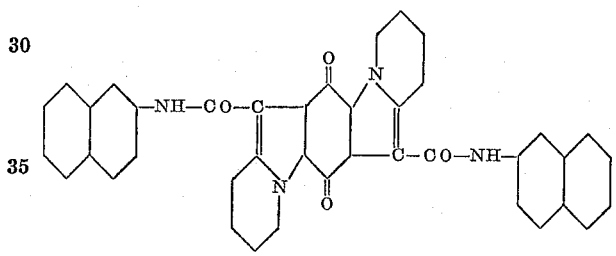

and gives neutral grey dyeings of the same fastness properties as the products of the preceding examples.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

We claim:

1. A dyestuff having the formula

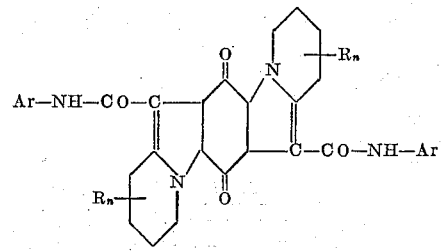

wherein Ar represents an aromatic radical selected from the group consisting of phenyl and naphthyl radicals and their auxochrome substituted derivatives; R is selected from the group consisting of lower alkyl and alkoxy; and $n$ has a value of 0 to 3.

2. A process for producing a dyestuff as defined in claim 1 comprising reacting by heating chloranil, a pyridine compound having the formula

in which the 2-position is unsubstituted, R is selected from the group consisting of lower alkyl and alkoxy, and $n$ has a value of 0 to 3, and an N-aromatic acetoacetamide of the formula CH₃—CO—CH₂—CO—NH—Ar wherein Ar represents an aromatic radical selected from the group consisting of phenyl and naphthyl radicals and their auxochrome substituted derivatives.

3. A dyestuff of the formula

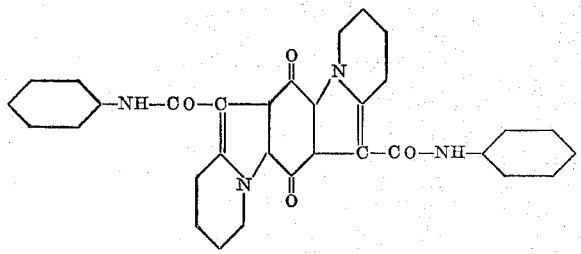

4. A process for producing a dyestuff as defined in claim 3 comprising reacting by heating chloranil, pyridine, and acetoacetanilide.

5. A dyestuff of the formula

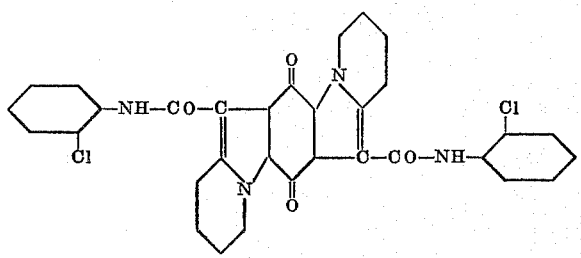

6. A process for producing a dyestuff as defined in claim 5 comprising reacting by heating chloranil, pyridine, and acetoacet-ortho-chloranilide.

7. A dyestuff of the formula

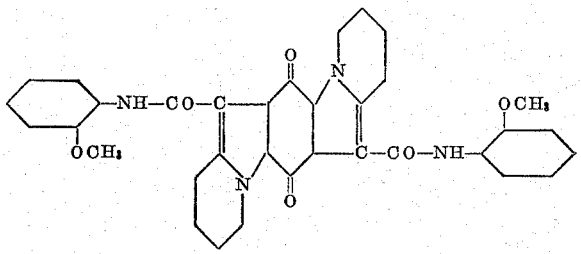

8. A process for producing a dyestuff as defined in claim 7 comprising reacting by heating chloranil, pyridine, and acetoacet-ortho-anisidide.

9. A dyestuff of the formula

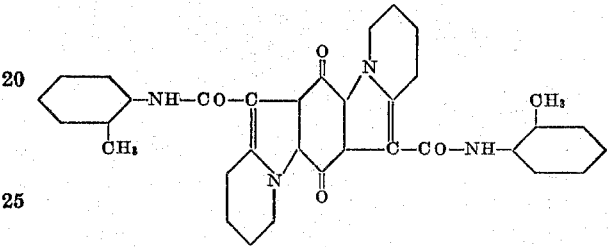

10. A process for producing a dyestuff as defined in claim 9 comprising reacting by heating chloranil, pyridine, and acetoacet-ortho-toluidide.

11. A dyestuff of the formula

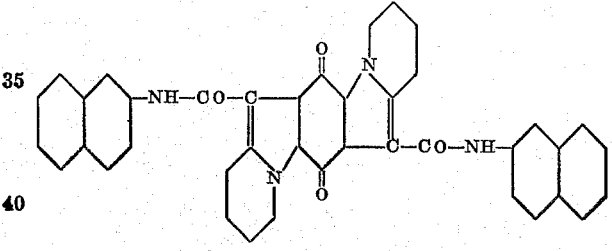

12. A process for producing a dyestuff as defined in claim 11 comprising reacting by heating chloranil, pyridine, and acetoacet-beta-naphthylamide.

No references cited.